(12) United States Patent
Tondolo et al.

(10) Patent No.: US 12,140,457 B2
(45) Date of Patent: Nov. 12, 2024

(54) DEVICE FOR CHECKING THE POSITION OF AN ACTUATOR

(71) Applicant: STI S.R.L, Levate (IT)

(72) Inventors: Flavio Tondolo, Levate (IT); Mirko Coffetti, Levate (IT); Roberto Valoti, Levate (IT); Nicola Zenoni, Levate (IT)

(73) Assignee: STI S.R.L., Levate (IT)

( * ) Notice: Subject to any disclaimer, the term of this patent is extended or adjusted under 35 U.S.C. 154(b) by 199 days.

(21) Appl. No.: 17/926,727

(22) PCT Filed: May 20, 2021

(86) PCT No.: PCT/IB2021/054360
§ 371 (c)(1),
(2) Date: Nov. 21, 2022

(87) PCT Pub. No.: WO2021/234615
PCT Pub. Date: Nov. 25, 2021

(65) Prior Publication Data
US 2023/0204393 A1    Jun. 29, 2023

(30) Foreign Application Priority Data
May 22, 2020 (IT) .......... 102020000011962

(51) Int. Cl.
*G01D 5/249* (2006.01)

(52) U.S. Cl.
CPC ................... *G01D 5/249* (2013.01)

(58) Field of Classification Search
CPC .................. G01D 5/249; G01D 5/145
USPC ............ 324/207.2, 207.13, 207.11, 200
See application file for complete search history.

(56) References Cited

U.S. PATENT DOCUMENTS

| 10,180,314 B1* | 1/2019 | Posey | ............... G01D 5/14 |
| 2014/0125267 A1* | 5/2014 | Suzuki | ............... B62D 5/04 |
| | | | 324/207.21 |
| 2021/0293579 A1* | 9/2021 | Xie | ............... G01D 5/249 |

* cited by examiner

*Primary Examiner* — Giovanni Astacio-Oquendo
(74) *Attorney, Agent, or Firm* — R. Ruschena Patent Agent, LLC

(57) ABSTRACT

A device for checking the position of a mechanical element in translational or rotational motion which performs a predetermined stroke, the device being provided with a magnetic component integral with the mechanical element whose position is to be determined and a stationary magnetic sensor, the magnetic component has at least one magnetic element arranged according to a helical pattern.

9 Claims, 3 Drawing Sheets

DEVICE FOR CHECKING THE POSITION OF AN ACTUATOR

BACKGROUND OF THE INVENTION

1. Field of the Invention

The present invention relates to a device for checking the position of a mechanical element in translational or rotational motion. In particular, the device is suitable for controlling the position of an actuator, preferably a linear pneumatic actuator.

In general, controlling a generic system is equivalent to imposing a desired behavior on it. More specifically, this consists in defining a controller capable of processing the information coming from a feedback signal, generated by a transducer. All this can be summarized with the definition of a closed loop control system, used for different applications in different sectors, especially in those related to the automation field.

In order to build a closed control loop, it is of fundamental importance to choose the variable to be controlled, which is closely connected with the feedback signal and therefore also with the sensor which has the task of generating the feedback signal.

In order to control the motion of a mechanical element, it is usual to develop a positioning system, based on a controller capable of processing information relating to the instantaneous position of the element itself. Hence the need to develop a device suitable for controlling a position, including but not being limited to, a suitable position sensor.

2. Brief Description of the Prior Art

As it is known, in the automation field the position sensors can be divided in different macro-categories, for example according to the type or according to the coupling with the mechanical element.

According to the type, incremental or absolute position sensors can be distinguished. The first ones, being devoid of an intrinsic reference, must carry out a calibration procedure at each start-up in order to reassign the zero reference. The second ones, on the other hand, once the initial calibration has been carried out, are always capable to detect the correct measurement, without repeating each time the procedure from the beginning.

On the basis of the coupling with the mechanical element, contact sensors or non-contacting or "contactless" sensors are defined according to the most common Anglo-Saxon terminology. Contact sensors, such as potentiometers, usually use a mechanism coupled with the mechanical system to carry out the measurement, while contactless sensors, such as optical encoders or magnetic transducers, do not provide for direct contact between the moving parts and therefore have to resort to more complex technologies. Contactless sensors, however, have a considerable advantage from a mechanical point of view: the absence of contact between the moving parts leads to an absence of component wear, therefore to a useful life if not infinite, certainly longer than that of the contact sensors.

The present invention takes as an example of implementation a non contacting magnetic sensor and therefore it concentrates in the following on contactless magnetic sensors, which, in order to extrapolate the necessary information, must be able to communicate with a component capable of generating a magnetic field. A magnetic field $\vec{B}$, in general, can be schematized as a vector field. As such, it can be represented with the field lines, which are tangent in each of their points to individual carriers $\vec{B}$, each of which is decomposable into three main Cartesian components $\vec{B}_x$, $\vec{B}_y$, $\vec{B}_z$, defined by a reference Cartesian tern, conventionally allocated by the orientation of the position sensor. The measured variable is therefore the relative position between the sensor and the magnetic component. In order to measure its relative position, one of the two elements (it does not matter which of the two) must be suitably fixed, so as to identify the reference for the component in motion.

The first limitations, during the design phase, are assigned by the specific sector in which they must operate. In the case of this patent, one wants to investigate a position sensor aimed at the automation of a pneumatic positioning system, consisting of a positioning means which has the task of moving a linear actuator. However, the idea is to find a solution that can also be adapted to other sectors and other applications. In particular, the primary aim is to obtain an suitable solution for the evaluation of the position of both a translating and rotating mechanical system.

As it is also known, in the specific field of pneumatic automation, the development of a sensor encounters significant drawbacks: often the dynamics of the mechanical system to be controlled is high and the constraints to be observed in the development phase are many.

A main technical problem consists in that the control of the mechanical system is operated with a current signal which varies between 4 mA to 20 mA. Therefore, necessarily, in order to manage the power supply of all the electrical components, a current value of less than 4 mA must be used. This implies that the energy consumption of the sensor used must be sufficiently low, commensurate with that of the other elements used. It may therefore be useful to install a sensor capable of activating only in the event of an actual request for use, a remaining shut off for the rest of the time. If this represents an advantage from the consumption point of view, on the other hand it implies a second technical problem: it is mandatory, in fact, to adopt an absolute position sensor, since, when using an incremental position sensor, the calibration should be made at each ignition, so consequently losing its previously defined reference. In addition, a third technical problem consists in that in order to cope with high mechanical performances, also the sensor must ensure a similar dynamic response, while respecting the constraints outlined in above.

Finally, a magnetic contactless sensor, used for a pneumatic positioning system, must solve a further technical problem linked to the non-linearity of the measurement. This entails an additional limitation, linked to the maximum stroke deductible from the sensor, which directly affects the maximum stroke of the actuator.

An example of this technology is described in U.S. Pat. No. 6,909,281B2. In particular, the document describes a Hall effect sensor which measures the intensity of the magnetic field, generated by a bar designed ad hoc and located in the point where the sensor is located, with the aid of a concentrator. The shape of the field is particular and is designed to set up a linear relationship between the position of the mechanical system and the intensity of the field itself. The limit of the solution described in the prior document is inherent in the impossibility of managing long strokes, due to the small variation of the gradient of the magnetic field, which involves important non-linearities in the measurement performed.

There is therefore the need to define a device for controlling the position of a mechanical element in a translational or rotational motion and, more particularly, a device for checking the position of an actuator, that is free from the drawbacks mentioned above.

SUMMARY OF THE INVENTION

One aim of the present invention is therefore the definition of a device for checking the position of a mechanic element in translational or rotational motion which performs a predetermined stroke and, in particular, a device for checking the position of an actuator, preferably, but not necessarily, a linear pneumatic actuator. The device must be able to handle long strokes of the actuator and in any case must be devoid of the drawbacks relating to applications according to the known art.

Still more in particular, the control device object of the present invention may comprise a magnetic contactless sensor, as described according to the teachings of the prior art.

More in general, the device comprises two necessary elements: one component capable of generating a particular shape of magnetic field and a sensor sensitive to the field itself.

The magnetic component has a helical shape, being able to be, for example, either a flexible magnetic element of helical shape or a non magnetic linear bar in which a plurality of magnetic elements arranged with a helical shape are inserted. Ultimately, whatever the solution chosen for the magnetic component, it must be able to generate a very precise field shape.

The sensor, which is not in itself part of the present invention but is in combination with the magnetic component, is based on a technology that integrates the action of several distinct Hall effect sensors, preferably compacted into a single electronic board, in such a way as to be able to measure the value of the magnetic field in different directions. Therefore, the sensor does not directly return the instantaneous position of the mechanical system, but instead the magnetic field strength values according to the different directions identified by the individual Hall effect sensors.

For this reason, it was necessary to develop also a methodology for decoding and processing the signals coming from the various Hall effect sensors. This was achieved in the form of a specific decoding algorithm capable of processing the data emitted by the sensor, finally extrapolating the desired variable, that is the position of the mechanical system of interest.

Alternatively, other types of sensors sensible to the magnetic field can also be used, such as MEMS sensors or magneto-resistive sensors, always maintaining the same decoding algorithm and paying attention to the compliance with the performance and electronic constraints introduced above.

One of the main advantages is that, by extrapolating the field strength value over multiple defined directions, it is possible to use a single sensor capable of measuring both linear and angular displacements.

According to a first aim of the present invention, therefore, a device is described for checking the position of a mechanical element in a translational and rotational motion, which performs a predetermined stroke and has the characteristics set out in the attached independent claim of the device.

According to a further aim of the present invention, a method for decoding a position signal is described, having the characteristics set out in the attached independent claim of the method.

Additional embodiments of the above-mentioned plant, which are preferred and/or particularly advantageous, are described according to the characteristics set forth in the attached dependent claims.

BRIEF DESCRIPTION OF THE DRAWINGS

The invention will now be described with reference to the attached drawings, which illustrate some non-limiting examples of embodiment, in which.

DETAILED DESCRIPTION OF THE PREFERRED EMBODIMENTS

Figure 1:
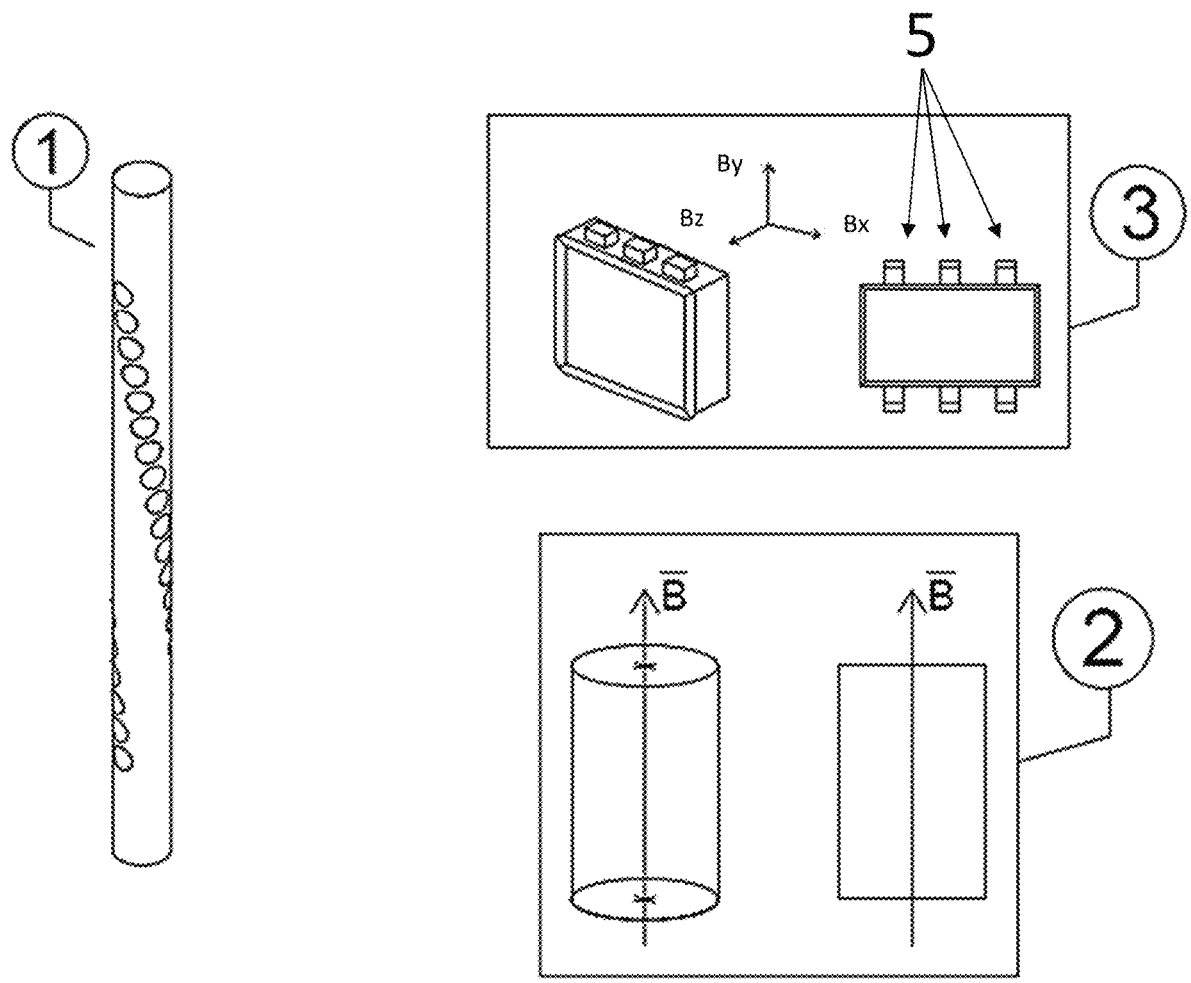
FIG. 1 shows the schematic drawings of the individual components of the device for checking the position, according to one embodiment of the present invention.
Figure 2:
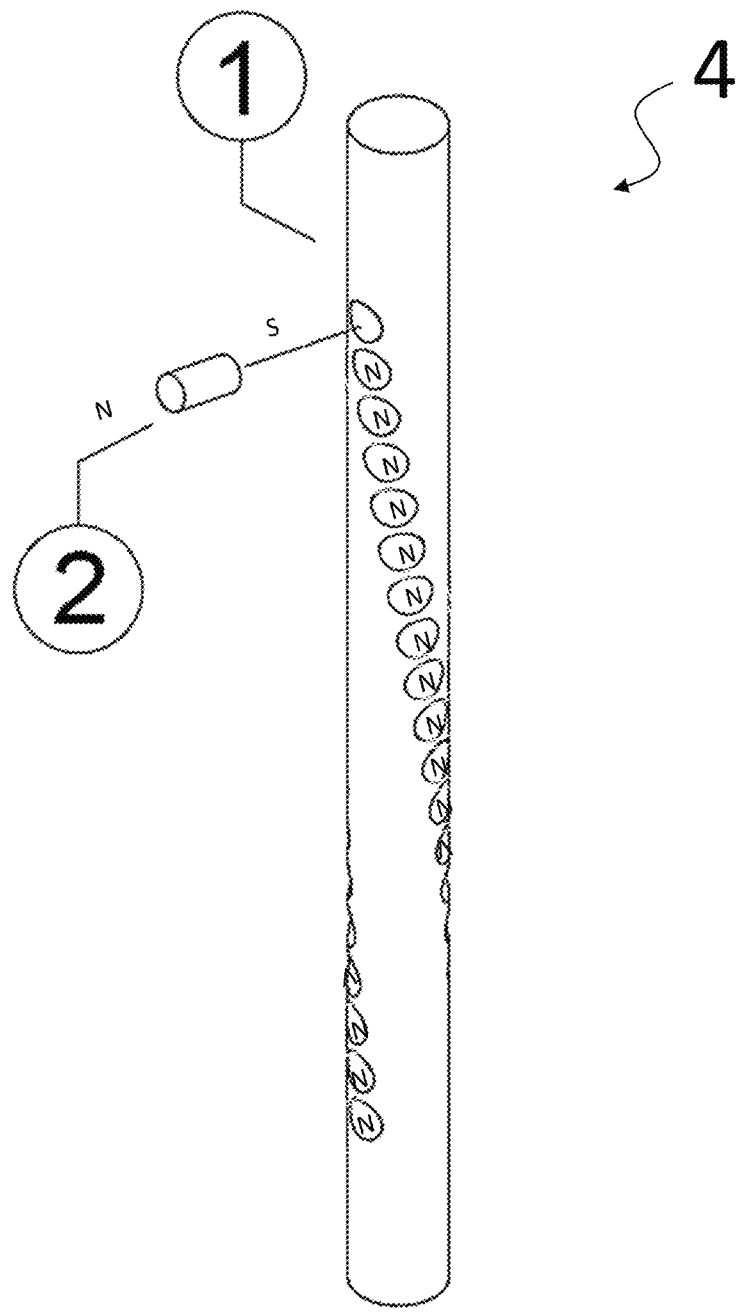
FIG. 2 is an assembly diagram of the magnetic component of FIG. 1.

Referring now to the above figures, hereinafter a device 10 is described for checking the position of a mechanical element in a translational or rotational motion. The device comprises a magnetic component 4 integral with the mechanical element the position of which is to be determined and a stationary magnetic sensor 3.

The magnetic component 4 must be able to generate a particular field shape. In order to obtain such result one possible solution is that the magnetic component 4 comprises a bar 1 of non-magnetic material, for example aluminum, provided with a plurality of holes 6 and in said plurality of holes 6 a plurality of magnetic cylinders 2 is fixed with interference (glued or embedded), one cylinder 2 for each hole 6, wherein the cylinders 2 are polarized according to same direction, identified by the field vector $\vec{B}$.

The individual magnetic cylinders 2 are arranged along the non magnetic bar 1 following a helical pattern. The number and arrangement of the magnetic cylinders along the helix are determined so as to obtain an angular displacement of the magnetic field between the end magnetic cylinders 2', 2", equal to an angle sufficiently large to ensure an efficient interpretation of the values, for example an angle between 90° and 270° (in the figure, it must be noted, for example, that the referred angle is approximately flat). As the angular displacement and the distance between consecutive magnetic cylinders can be imposed at will, the length of the non-magnetic bar 1 is also imposed and, therefore, it can be proportional to the stroke of the actuator.

Therefore, it can be said that, with this technology, there is no measurable maximum stroke limit. For this reason, it is possible to develop different non-magnetic bars, always provided with a helix of magnetic cylinders and which have a different length, depending on the stroke to be actually measured.

As an alternative to this solution, the magnetic component can have a different design, as long as it is able to replicate the same shape of the magnetic field. An example could be to use a flexible material with high magnetic properties, with which to replicate the helical shape given by the arrangement of the magnetic cylinders in the case previously illustrated. Otherwise, according to a further example, the magnetic component can be devoid of the non-magnetic bar and comprise a plurality of small prismatic-shaped magnets, arranged with an angle of phase shift between them, in such a way as to reconstruct, also in this case, a helical profile.

Figure 3:
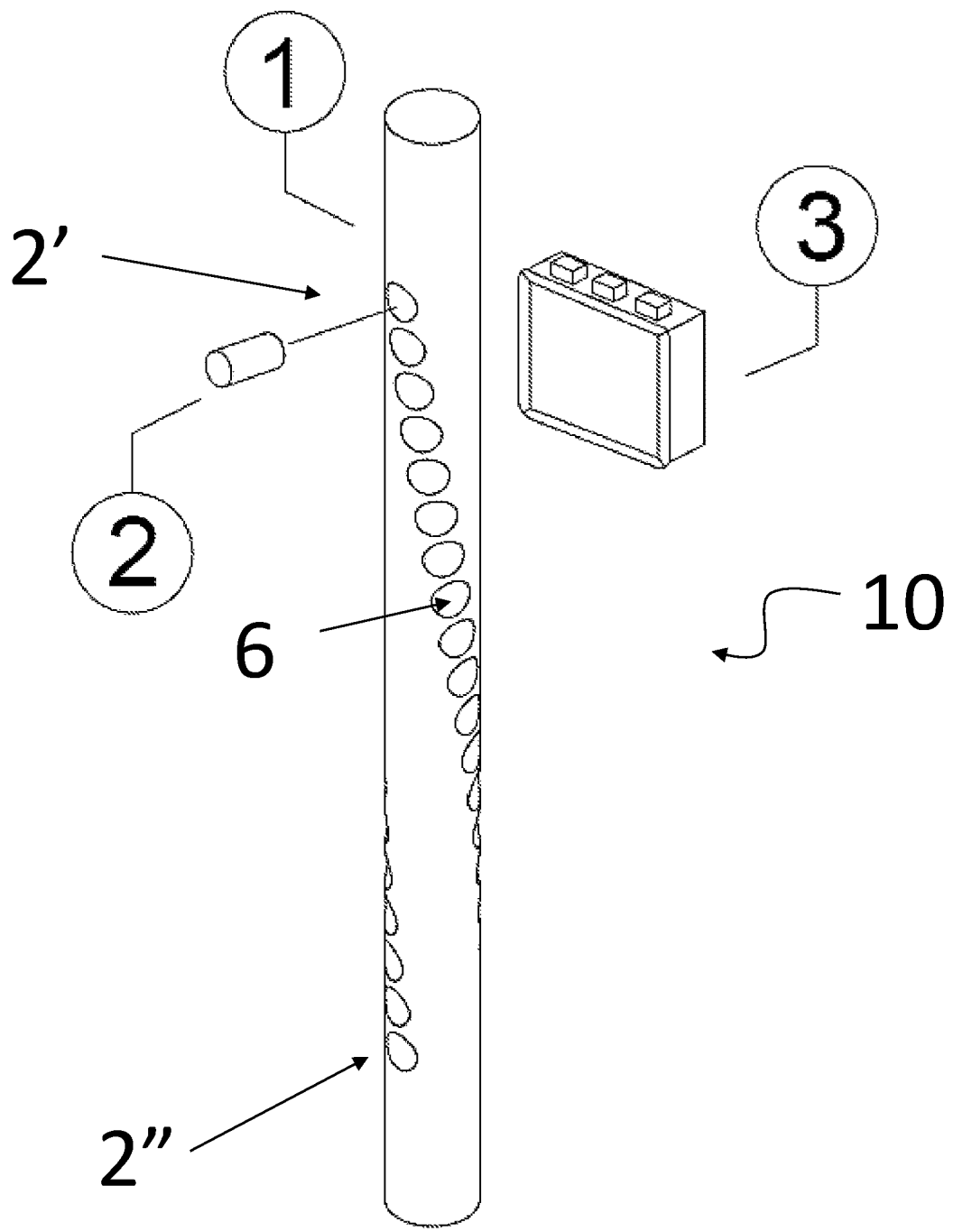
FIG. 3 is a schematic representation of the final solution of the device of FIG. 1.

The sensor 3 sensitive to the magnetic field, suitably constrained, must be chosen so that it can detect the field simultaneously on several conventionally defined directions. Advantageously, a solution is represented by a three-dimensional magnetic sensor 3, which contains inside it three distinct Hall effect sensors 5, arranged orthogonally to each other to form a reference Cartesian triad and compacted in a single electronic board. This allows to obtain the intensity of the magnetic field on the three axes defined by the reference triad, given by the orientation of the individual Hall effect sensors 5, strictly connected to the spatial orientation of the sensor itself. Therefore, the sensor 3 does not directly return a position value, but the three field components $\vec{B}_x$, $\vec{B}_y$, $\vec{B}_z$ on the three axes of the triad. Therefore, the same results can also be obtained with sensors of different types capable of returning the intensity of the field in several directions. A schematic drawing of the device as a whole is shown in FIG. 3.

The extrapolation of the value of the instantaneous position of the mechanical element is obtained thanks to a specific method based on a decoding algorithm. The aim of the method is to associate the quantities related to the magnetic field with the relative position between the sensor and the magnetic component. Ultimately the method includes the following steps of:

detecting one or more quantities linked to the generated magnetic field;

correlating the position of the mechanical element to the quantities linked to the magnetic field.

In order to do this, two different approaches have been developed. The first one is based on the analysis of the trend of the lines of force of the magnetic field. This is equivalent to quantifying the slope of the lines of force, an operation which coincides with the calculation of the angle of inclination, point by point, of the individual field vectors $\vec{B}$ tangentially to the lines of force themselves. In order to avoid complex considerations with solid angles, it is necessary to determine the trend of the lines of force projected on a Cartesian reference plane, chosen on the basis of the geometry of the field and the relative orientation between sensor and magnetic component. This means that, by selecting two components of the field corresponding to the Cartesian reference plane still previously chosen, it is theoretically possible, by exploiting the arctangent and modifying its trend with a scale factor k set by the user, to determine a mathematical function which expresses the trend of the slope of the lines of force in relation to the position. Supposing, for example, to choose the XY plane as the Cartesian reference plane, then using the components $\vec{B}_x$ and $\vec{B}_y$, extrapolated from the sensor, it is possible to calculate:

$$\vartheta_{XY} = \arctan\left(\frac{B_x}{k \cdot B_y}\right) \text{ or } \vartheta_{YX} = \arctan\left(\frac{B_Y}{k \cdot B_x}\right)$$

The advantage is that, considering the magnetic field generated by the helix bar, the mathematical function in question is monotonous and easily interpolated with a straight line. Therefore, once the equation of the interpolating straight line has been obtained, a linear relationship will be available between the position of the mechanical system and the slope of the lines of force. Therefore, by exploiting the inverse formulas, it is possible to return to the target variable (position of the mechanical element) from the Cartesian components of the magnetic field. In this way, the problem of the non-linearity is drastically reduced, as linear curves are considered. Furthermore, thanks to the optimum repeatability of the measurement, it can be sure that the same position value will always correspond to each slope value.

By using a magneto-resistive sensor, which measures the total intensity of the magnetic field and its angle of inclination, it is possible to reach the same conclusions, without resorting to the calculation of the angle with the arctangent function, The second approach of the decoding algorithm instead exploits all three Cartesian components $\vec{B}_x$, $\vec{B}_y$, $\vec{B}_z$. In fact, it can be observed how, in no point of the space, $\vec{B}_x$, $\vec{B}_y$, $\vec{B}_z$ be repeated, by assuming the same values. In other words, by moving the sensor 3 in any direction with respect to the magnetic component 4, although remaining in any case at a distance such as to obtain suitable values from the measurement, ternary values $\vec{B}_x$, $\vec{B}_y$, $\vec{B}_z$ are always obtained, which are different from each other. This constitutes a considerable advantage, as thanks to an appropriately defined lock-up table or by referring to a mathematical function capable of determining the exact value of the components of the field at each point, it is possible to define the correct relative position between sensor and magnetic bar. Furthermore, by exploiting this algorithm, as the exact value of the field is known in any point of the space, it is possible to discriminate the presence of small displacements or vibrations, the presence of which is inevitable in a real case, by extrapolating only the exact position of the mechanical system, only in the direction of the motion to be detected. This is particularly useful when the system is able to act and control only one axis, but small movements occur outside the control, even in the other directions.

In addition to the embodiments of the invention, as described above, it is to be understood that numerous further variants exist. It must also be understood that said embodiments are only exemplary and do not limit neither the aim of the invention, nor its applications, nor its possible configurations. On the contrary, although the above description makes it possible for the skilled person to implement the present invention at least according to an exemplary configuration thereof, it must be understood that numerous variations of the components described are conceivable, without thereby departing from the object of the invention, as defined in the attached claims.

The invention claimed is:

1. A device (10) for checking position of a mechanical element in translational or rotational motion which performs a predetermined stroke, the device (10) comprising a magnetic component (4) integral with the mechanical element whose position is to be determined and a stationary magnetic sensor (3), wherein the magnetic component (4) comprises at least one magnetic element arranged according to a helical pattern-wherein said magnetic component (4) comprises a bar (1) of non-magnetic material, provided with a plurality of holes (6) and in said plurality of holes (6) a plurality of magnetic cylinders (2) is fixed with interference, one cylinder (2) for each hole.

2. The device according to claim 1, wherein said at least one magnetic element ends, having, among them, an angular phase shift of a magnetic field comprised between 90° and 270°.

3. The device (10) according to claim 1, wherein said bar (1) has a length proportional to the predetermined stroke of an actuator.

4. The device (10) according to claim 1, wherein the stationary magnetic sensor (3) is three-dimensional and comprises inside three different Hall effect sensors (5) arranged orthogonally between them to form a Cartesian reference triad.

5. The device (10) according to claim 4, wherein said stationary magnetic sensor (3) returns three field components ($B_x$, $B_y$, $B_z$) on three axes of the triad.

6. The device (10) according to claim 1, wherein the stationary magnetic sensor (3) is a magneto-resistive sensor.

7. A method for decoding a position signal by means of the device (10) as described by claim 1, comprising the following steps:

a. detecting one or more quantities related to a generated magnetic field generated by the magnetic element arranged according to a helical pattern, and b. correlating a position of the mechanical element to one or more quantities related to the generated magnetic field.

8. The method according to claim 7, wherein step a. includes the following steps:

a1. determining a mathematical function that expresses the trend of the flux lines slope of the magnetic field, a2. deriving an equation of interpolating straight line of the mathematical function, and wherein step b. includes a phase of obtaining the position of the mechanical element using inverse formulas of the equation of the interpolating straight line.

9. The method according to claim 7, wherein step a. includes a phase defining a lock-up table or a mathematical function capable of determining exact value of the components of a field at each point.

* * * * *